United States Patent [19]

Ozawa et al.

[11] Patent Number: 4,894,668

[45] Date of Patent: Jan. 16, 1990

[54] RECORDER HAVING MEANS FOR SUPPORTING THE ENTIRE WIDTH OF A CONTINUOUS RECORDING MEDIUM

[75] Inventors: Masa K. Ozawa, Ebina; Kunitaka Ozawa, Isehara; Katsunori Hatanaka, Yokohama; Tetsuo Suzuki, Hiratsuka; Tetsuzo Mori, Hirtsuka; Tadashi Shiina, Hiratsuka; Ryuichi Ebinuma, Atsugi, all of Japan

[73] Assignee: Canon Kabushiki Kaisha, Tokyo, Japan

[21] Appl. No.: 277,522

[22] Filed: Nov. 28, 1988

Related U.S. Application Data

[60] Continuation of Ser. No. 3,052, Jan. 13, 1987, abandoned, which is a division of Ser. No. 733,389, May 13, 1985, Pat. No. 4,651,173.

[30] Foreign Application Priority Data

| | | | |
|---|---|---|---|
| May 19, 1984 | [JP] | Japan | 59-101508 |
| May 19, 1984 | [JP] | Japan | 59-101509 |
| May 19, 1984 | [JP] | Japan | 59-101510 |
| May 19, 1984 | [JP] | Japan | 59-101511 |
| May 19, 1984 | [JP] | Japan | 59-101512 |

[51] Int. Cl.[4] .......................... G01D 15/28; B41J 30/4

[52] U.S. Cl. ................................ 346/136; 400/613.2; 400/617

[58] Field of Search ..................... 346/136; 400/613.2, 400/613.3, 613.4, 617

[56] References Cited

U.S. PATENT DOCUMENTS

| | | | |
|---|---|---|---|
| 2,446,400 | 8/1948 | Woolley | 346/136 X |
| 3,442,503 | 5/1969 | Call . | |
| 3,561,659 | 2/1971 | Anthony | 226/180 |
| 3,611,431 | 10/1971 | Rosmanith | 346/145 |
| 3,627,304 | 12/1971 | Reeder . | |
| 4,165,029 | 8/1979 | Mitchell | 346/136 X |
| 4,651,173 | 3/1987 | Ozawa | 346/136 |

OTHER PUBLICATIONS

Knappe et al; Printer Paper Straightener; IBM TDB, vol. 26, No. 2, Jul. 1983, p. 814.

*Primary Examiner*—Joseph W. Hartary

*Attorney, Agent, or Firm*—Fitzpatrick, Cella, Harper & Scinto

[57] ABSTRACT

A recorder comprises a recording device housing for housing recording device for making a record on a continuous record medium at a record position, and a device for supporting the weight of the record medium over its entire width upstream of a pinch position thereof formed by pinch and press rollers.

7 Claims, 13 Drawing Sheets

RECORDER HAVING MEANS FOR SUPPORTING THE ENTIRE WIDTH OF A CONTINUOUS RECORDING MEDIUM

This application is a continuation of application Ser. No. 003,052 filed Jan. 13, 1987, now abandoned, which is a division of application Ser. No. 733,389 filed May 13, 1985, now U.S. Pat. No. 4,651,173.

BACKGROUND OF THE INVENTION

1. Field of the Invention

The present invention relates to a recorder, and more particularly to a recorder which uses a record paper as a record medium.

2. Description of the Prior Art

In a conventional recorder, a feed unit for a record paper is positioned near recording means. However, since the feed unit is fixed relative to the recording means in the prior art recorder, it is difficult for an operator to exchange the record paper, repair troubles in the feed unit such as paper jam and repair troubles in the recording means. It is also difficult for a serviceman to maintain the recorder.

The recorder of this type has a feed unit for feeding the record paper to the recording means and feeding the record paper away from the recording means. The feed unit includes a paper feed roller driven by a motor and a press roller arranged to face the paper feed roller to press the record paper to the paper feed roller. When the record paper is to be loaded to the recorder, the operator first positions a leading edge of the record paper between the paper feed roller and the press roller and holds it there between in preparation for recording. In the record mode, the record paper is held between the paper feed roller and the press roller and is fed by rotating the paper feed roller as a record is m made by the recording means.

One of the prior art recorders of this type has a press roller which is pressed to the paper feed roller by a spring. When the record paper is to be loaded, the spring is flexed to move the press roller slightly away from the feed roller so that the leading edge of the record paper may be inserted. In another prior art recorder, when the record paper is to be loaded, the connection between the feed roller and the drive unit is disconnected and the feed roller is manually rotated so that the record paper is held in position.

However, the work space in the recorder which is provided for to the operator when the record paper is to be loaded is limited. It is therefore difficult to load the record paper in the first prior art recorder in which the space between the press roller and the feed roller is small. It is likewise difficult to load the record paper in the second prior art recorder in which no space is provided between the press roller and the feed roller.

In other prior art recorders of this type, a continuous form such as a fan-folded paper or a rolled paper loaded below the record position of the recording means is continuously fed to the record position in the record mode. The record paper is held between the feed roller and the press roller, and as the feed roller rotates, the record paper loaded below the record position is continuously pulled up and the record is made by the recording means.

The press roller is not designed to have a uniform diameter over its entire width along the axis, rather it is designed to have a larger diameter portion, for example, at a center area along the axis, so that the record paper is held by that portion. If the press roller is designed to hold the record paper over the entire width, the pressing force is not uniform because of tolerance in the manufacture of the pressing roller and mounting erros wherein the record paper may be skewed or snaked.

In a prior art recorder, the record paper loaded at the bottom of the recorder is pulled up by the feed roller and the press roller which has a small area to press the record paper to the feed roller. Since the weight of the record paper extending to the load position has to be supported by small area, the swing in the feed of the record paper, for example, skewing or snaking of the record paper due to unsmooth feeding of the record paper from the loaded position, is not prevented, and recording is distorted or the paper is jammed.

In a recorder having a stacker for stacking recorded papers, the stacker has one side thereof open so that the operator can take out the recorded papers. An upwardly convexed projection is formed on the bottom of the stacker to remove the curling of the recorded papers so that the recorded papers are stacked flatly.

However, since the projection extends over the entire width of the record paper at the lengthwise center of the bottom of the stacker, the recorded papers become unstable as a number of recorded papers are stacked and the stacked papers are easily dropped from the open side by shock.

In a non-impact type recorder which uses a continuous form having tie areas and cut areas alternately widthwise such as perforated rolled paper or fan-folded paper, feed rollers are provided upstream and downstream of the record paper feed path so that a flat record plane is formed between the feed rollers.

However, the perforation area of the perforated record paper may be stretched by a tension applied to the record paper during the feed of the paper and the record sheet may be crumpled. If it is crumpled, the record is distorted and, in an ink jet recorder which jets ink from nozzles to the record plane to make a record, the record paper contacts the nozzles, which causes clogging of the nozzles.

SUMMARY OF THE INVENTION

It is an object of the present invention to provide a recorder which resolves the problems encountered in the prior art recorders.

It is another object of the present invention to provide a recorder which allows easy connection and disconnection of a feed unit of a record paper and recording means, has high operability and is easy to maintain.

It is another object of the present invention to provide a recorder which secures a sufficient work area for loading a record paper by allowing a press roller to be moved substantially away from a feed roller so that the record paper is easily loaded and the record paper is securely held between the rollers during the feed of the record paper.

It is another object of the present invention to provide a recorder having means which contact the record paper over the entire width of the record paper before the record paper is pinched between the press roller and the feed roller, to support the weight of the record paper extending from the loaded position so that skewing or snaking in the feed of the record paper is prevented.

It is another object of the present invention to provide a recorder which uses a perforated continuous form and has means for removing creases caused by a tension acting on a perforation area.

It is another object of the present invention to provide a recorder which has a projection in a bottom of a stacker at a position closer to an open side of the stacker as viewed; and lengthwise so that stacked record papers are supported by an inner wall which faces the open side and the record papers are stacked stably.

It is another object of the present invention to provide a recorder for making a record by feeding a continuous form accomodated below a record position of the recording means to the record position by pinching the continuous form between a feed roller and a press roller, comprising means located upstream, in a feed path of the continuous form, of a pinch position of the continuous form defined by the feed roller and the press roller for contacting the continuous form over the entire width thereof to support the weight of continuous form extending from an accomodation position thereof.

DESCRIPTION OF THE PREFERRED EMBODIMENTS

Figure 1:
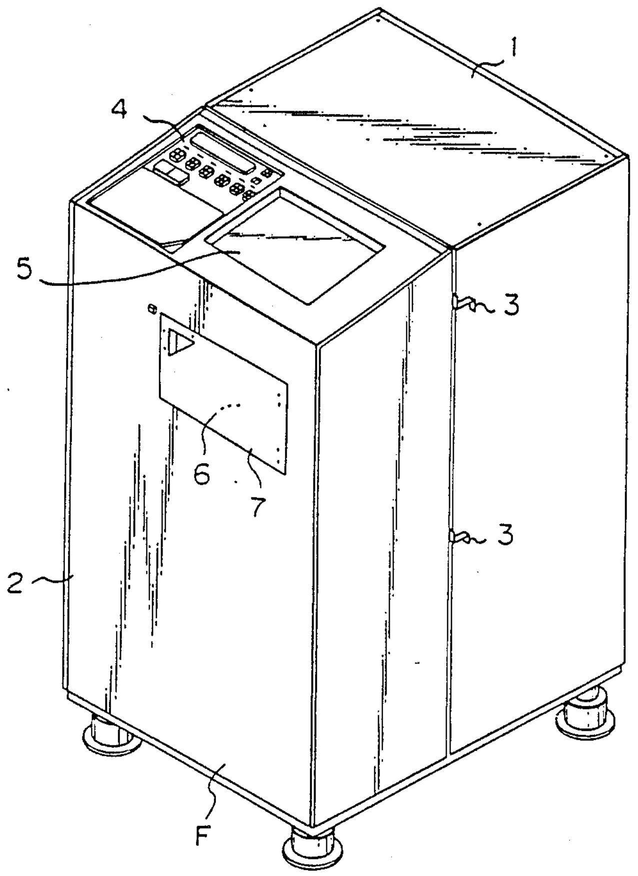
FIG. 1 is a perspective view of one embodiment of a recorder of the present invention.

FIG. 1 is a perspective view showing an external view of a recorder of the present invention. Numeral 1 denotes a printer housing which accommodates recording means therein, numeral 2 denotes a feed unit housing which accommodates a record paper and a feed unit therein, and numeral 3 denotes hinges of the housings 1 and 2. The feed unit housing 2 is pivotable around the hinges 3 to move away from the printer housing 1 and expose the interior of housings 1 and 2.

Numeral 4 denotes a console provided on a top of the feed unit housing and having a record condition display and function switches. Numeral 5 denotes a window to allow monitoring of a record condition of a record paper. Numeral 6 denotes a stacker having an open side on a front side F of the housing 2, and numeral 7 denotes a stacker door which covers the open side of the stacker.

Figure 2:
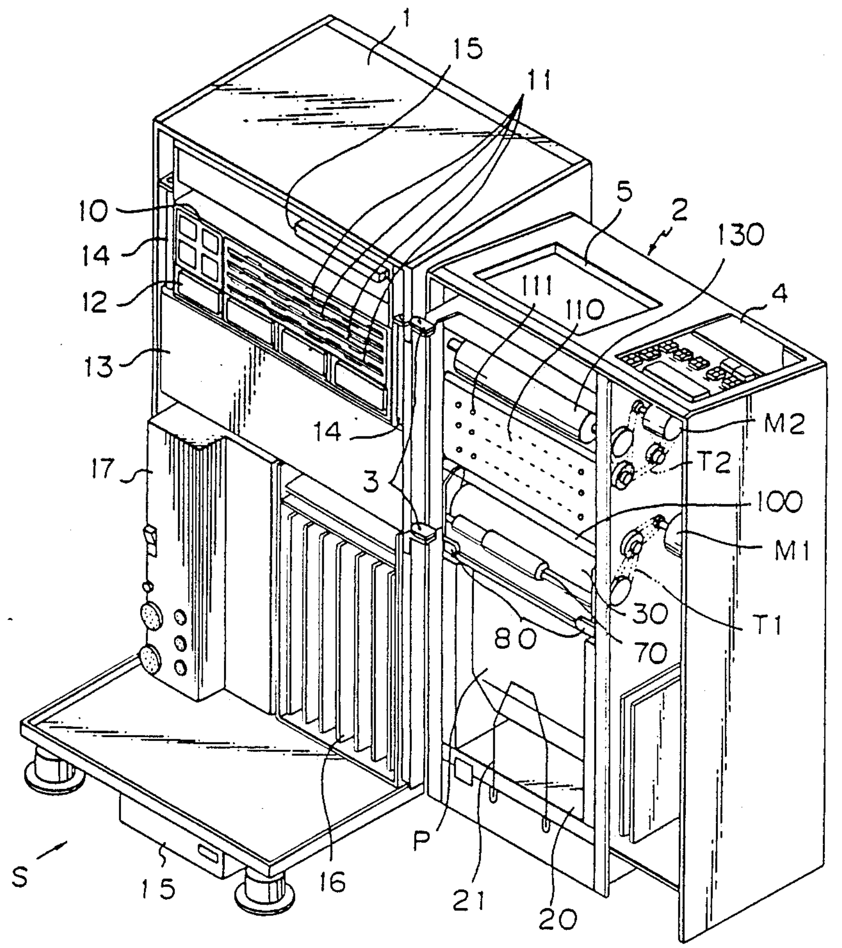
FIG. 2 is a perspective view of the recorder of FIG. 1 with a feed unit housing of the recorder being open.
Figure 3:
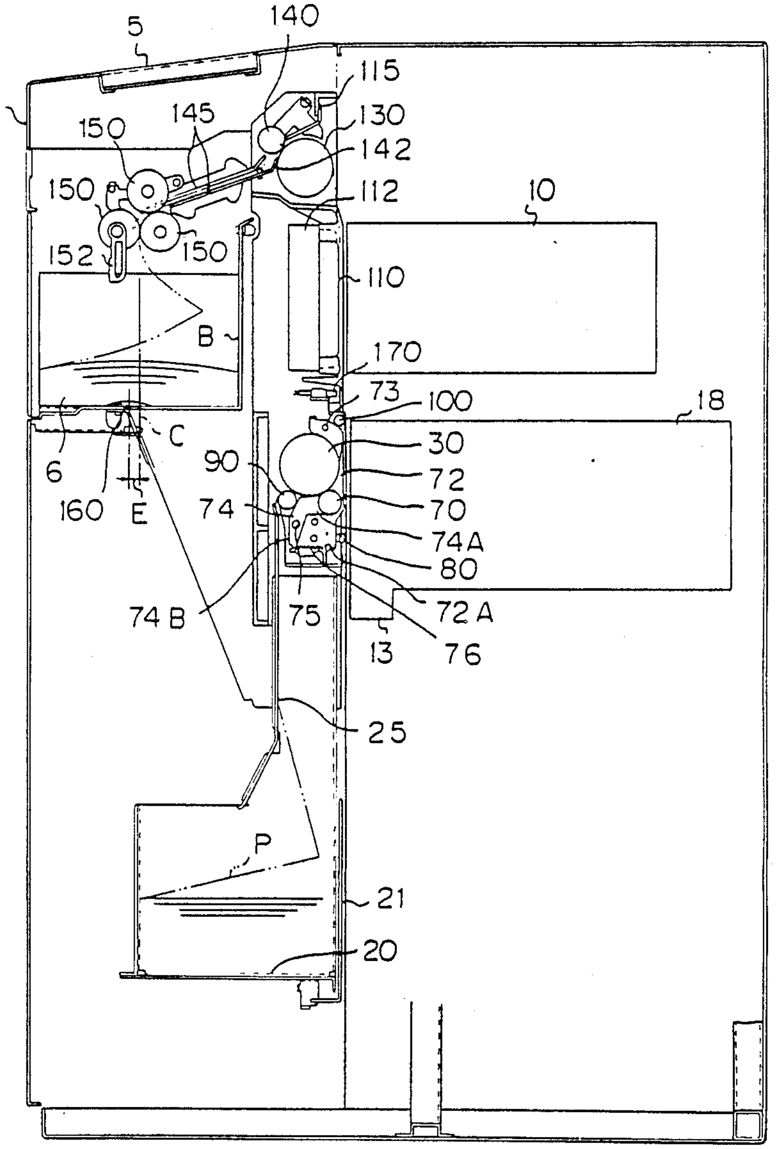
FIG. 3 is a side sectional view of the recorder of FIG. 1, FIGS. 4 and 5 are a front view and a perspective view of an embodiment of a lower paper feed unit in the recorder of the present invention.

FIG. 2 is a perspective view of the recorder of FIG. 1 with the feed unit housing 2 being opened to expose the inside of the recorder. FIG. 3 is a sectional view of the recorder with the feed unit housing 2 being closed. Numeral 10 denotes a printer (recording means) such as an ink jet printer disclosed in Japanese patent application Ser. Nos. 244131/1983 to 244138/1983 filed by the present assignee. Numeral 11 denotes a printer unit arranged in the printer 10 to make a record over an entire width of the record paper. Numeral 12 denotes cartridge tanks which store inks therein and are removably loaded to the printer 10. One cartridge tank for each of the number of colors of ink desired is provided.

Numeral 13 denotes a cap for recovering ink discharged when the recording head of the printer 10 is clogged or air bubbles are introduced therein. It is positioned below the printer 10 in the record mode. When the discharged ink is to be recovered in a pressure mode, as in the recorder shown in Japanese patent application Ser. No. 244131/1983, the cap 13 is moved upward along guide rails 14 to face the printer unit 11 so that it absorbs the inks discharged from the head.

Numeral 15 denotes an air filter arranged at a vent opening (not shown) on a rear side of the recorder and the inside of the recorder. In a closed position of the feed unit housing 2, the inside of the recorder communicates with the atmosphere through the air filter 15 so that the inside is protected from dust in the atmosphere. Numeral 16 denotes a cord rack for mounting a cord from a CPU for controlling the recorder and the record operation, a ROM which contains a control procedure, and a RAM which stores control information and record information. Numeral 17 denotes a power supply of the recorder and numeral 18 denotes a driver for the printer 10 and the cap 13.

Numeral 20 denotes a paper deck for accommodating therein a perforated fan-folded paper P as a record medium. Numeral 21 denotes a paper press spring to prevent the recorded paper P accommodated in the deck 20 from being shifted toward the printer housing 1. Numeral 30 denotes a lower paper feed roller driven by a motor M1 through a transmission mechanism T1. Numeral 70 denotes a press roller for pressing the record paper P to the lower paper feed roller 30 and has a larger diameter position at its axial center area to pinch the record paper P. Numeral 80 denotes a lever for moving the press roller 70 away from the feed roller 30.

Numeral 72 denotes side plates for supporting the opposite ends of the press roller 70. Each is pivotable around a shaft 73. Numeral 74 denotes a press roller arm having arms 74A and 74B, which is supported between the arms 74A and 74B by a pin 75 projecting from the side plates 72 and is pivotable around the pin 75. By supporting the press roller 70 with the arm 74 of the arm 74A and spanning a spring 76 between the other arm 74B and an upstanding portion 72A of the side plate 72, the feed roller 30 is pressed by the press roller 70. At a position on the side plate 72 which is very close to the pinch position of the record paper P by the lower paper feed roller 30 and the press roller 70, a deskew roller 90 is arranged. By contacting the deskew roller 90 to the entire width of the record paper P, the weight of the record paper P extending from the paper deck 20 can be supported and a wrapping angle of the record paper P to the roller 30 is increased. When the lever 80 is operated to rotate the side plate 72 around the shaft 74, the press roller 70 and the deskew roller 90 can be moved off the feed roller 30. The press roller 70 and the deskew roller 90 are included in the lower paper feed unit which will be described in detail hereinafter.

Numeral 100 denotes a decrumpling roller arranged on the feed path between the lower paper feed roller 30 and the platen 110. Longitudinal creases over the entire area of the record paper, originating from a perforation area of the record paper P due to tension acting on the record paper during the feed of the record paper, are removed by the decrumpling roller 100, and the record is made on an entirely flat record plane.

The platen 110 faces the printer 10 in the closed position of the feed unit housing 2 to form the record plane of the record paper P. The platen 110 has suction holes 111 and a suction fan 112 is arranged behind the platen 110. The fan 112 is driven in the record mode to suck the record paper P toward the platen 110 through the suction holes 111 so that the record plane is maintained flat.

Numeral 130 denotes an upper paper feed roller driven by a motor M2 through a transmission mechanism T2. The record paper P is fed by the upper paper feed roller 130 and the lower paper feed roller 30. Numeral 140 denotes an upper press roller which cooperates with the paper feed roller 130 to pinch the record paper. Numeral 150 denotes a stacker roller for feeding the recorded paper P fed by the upper paper feed roller 130 and the press roller 140 into the stacker 6. Numeral 152 denotes a guide member for folding the record paper P along the fold line or the perforation line to allow stacking of the record paper P onto the stacker 6. Numeral 160 denotes a convex area formed on the bottom of the stacker 6, widthwise of the record paper P, that is in the direction transverse to the plane of FIG. 3. In the present invention, the convex area 160 deviates from the lengthwise center C by a distance $\epsilon$ toward the front F.

In FIG. 3, numerals 25,115 and 145 respectively denote a paper guide to guide the record paper P to the deskew roller 90, a paper guide to guide the record paper P to the upper feed roller 130 and a paper guide to guide the record paper P to the stacker roller 150. Numeral, numeral 142 denotes a separation plate for separating the record paper P from the feed roller 130 and to direct it to the paper guide 145. Numeral 170 denotes a sensor for detecting the paper feed.

The feed operation of the feed unit, which is separable from the recording means, is now explained.

The record paper pulled up from the deck 20 by the feed rollers 30 and 130 is directed to the deskew roller 90 along the paper guide 25 having the substantially same width as the record paper. The weight of the paper extending from the deck 20 is supported by the deskew roller 90. The skewing and snaking of the paper are thereby removed. Thus, the lower paper feed roller 30 and the press roller 70 can feed the record paper P without causing skewing or snaking at the record position.

The creases of the record paper P created by the tension during the paper feed are removed by the decrumpling roller 100 before the record paper P reaches the record position. The record plane is maintained flat by the platen 110 and the suction fan 112. Under this condition, the record is made by the printer 10.

The recorded paper is guided by the paper guide 115 to the upper paper feed roller 130 and the upper press roller 140, separated by the separation plate 142 from the feed roller 130, and then stacked on the stacker 6 through the paper guide 145 and the stacker roller 150.

In the stacker 6, the concaved portion 160 is positioned forward of the lengthwise center of the stacked record paper P, that is, off the center of gravity toward the front side F so that the stacked record papers P are urged toward the back side B of the stacker 6. Accordingly, the stacked record papers are not biased to the front side by the shock caused by opening or closing the feed unit housing 2. The stacked record papers therefore are not dropped from the open side when the stacker door is opened to allow the take-out of the record papers.

Since the feed unit housing, including the drive mechanism, can be separated from the recording means, the feed condition can be checked in the open position.

Figure 4:
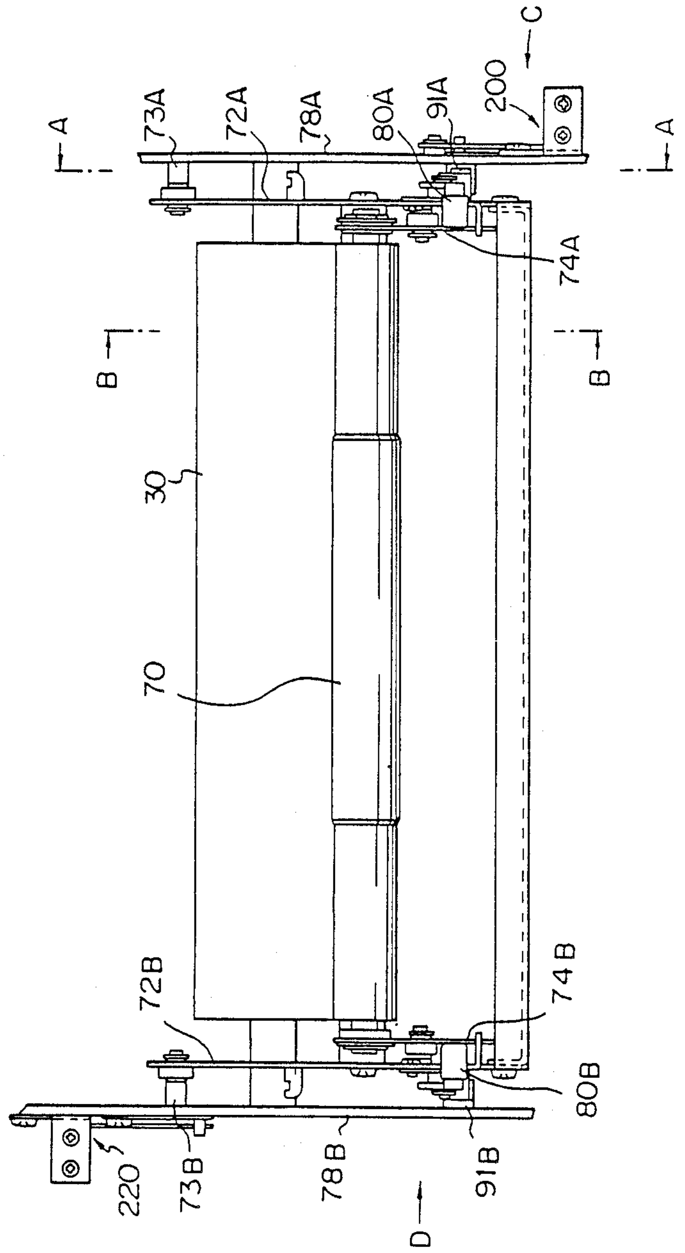

FIG. 4 is a view of the lower paper feed unit as viewed in a direction S in FIG. 2. Numerals 78A and 78B denote bases to support the feed roller 30, numerals 91A and 91B denote lock pins for positioning the press roller 70 when the feed roller 30 is engaged, and numerals 200 and 220 denote position adjusting mechanisms for adjusting the position of the press roller 70 relative to the feed roller 30. Those elements will now be explained. The sectional view of the lower paper feed mechanism in FIG. 3 is taken along a line B-B in FIG. 4.

Figure 5:
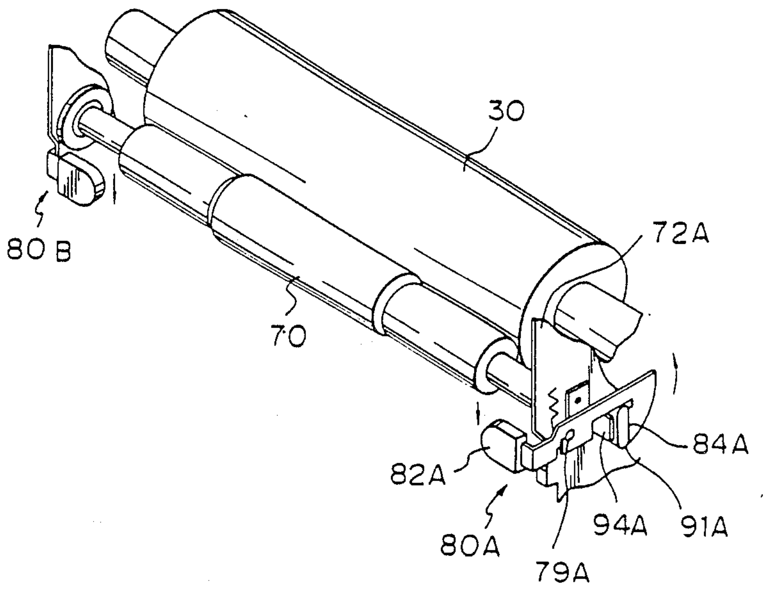

FIGS. 5 and 6 are a perspective view and a sectional view taken along a line A-A in FIG. 4, of the lower paper feed mechanism with the position adjusting mechanisms being omitted. The lever 80A is pivoted by the pin 79A projecting from the press roller side plate 72A. A button 82A is provided at one end of the lever 80A so that the operator depresses it when he/she intends to release the press roller 70 from the feed roller 30. A pawl 84A, adopted to engage with a lock pin 91A and a cam surface 86A, are provided at the other end. A spring 92 is spanned between the end of the lever 80A having the button 82A and the side plate 72A to impart a clockwise rotation force to the lever 80A. Numeral 94A denotes a block plate upstanding from the side plate 72A. A lock pin 91A, having a flat abutting surface, is held between the lock plate 94A and the pawl 84A so that a stable engagement is maintained.

Referring to FIG. 6, a procedure to open and close the lower paper feed mechanism when the record paper is loaded is explained. In FIG. 6(A), the lock pin 91A is pinched by the lock plate 94A and the pawl 84A and the side plate 72A, which supports the press roller 70 and the deskew roller 90, is secured. When the operator depresses the button 82A, the lever 80A is rotated counterclockwise, the lock pawl 84A is disengaged from the lock pin 91A, and the side plate 72A is pivotable around the pin 73A.

Figure 6A:
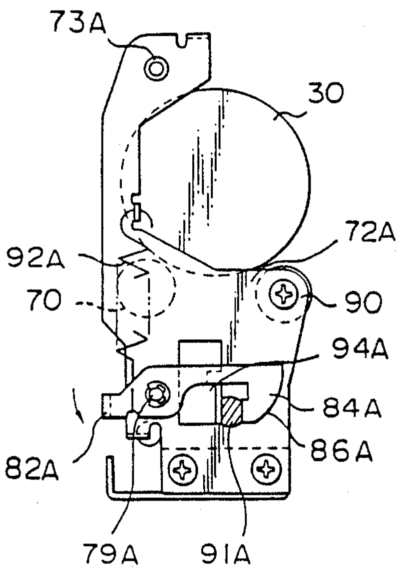
FIGS. 6A, 6B, 6C and 6D illustrate steps to open and close the lower paper feed unit.
Figure 6B:
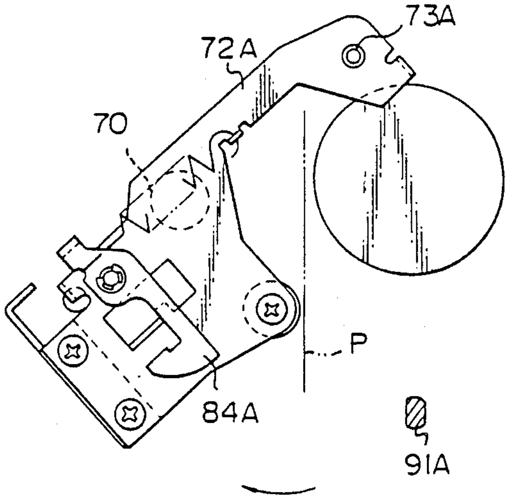
Figure 6C:
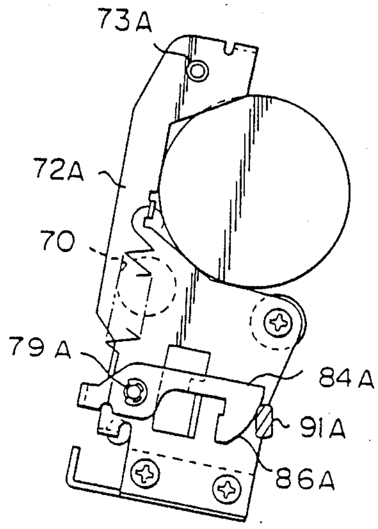
Figure 6D:
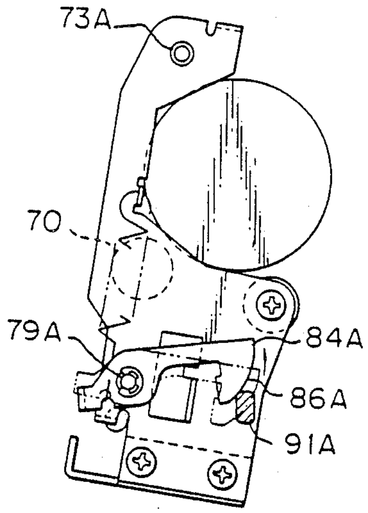

The side plate 72A is then rotated clockwise as shown in FIG. 6(B) to open the lower paper feed unit, and the record paper P is positioned as shown by a double-dot chain line. Then, as the side plate 72A is rotated counterclockwise, the cam surface 86A of the lever 80A is contacted to the lock pin 91A as shown in FIG. 6(C). As the side plate 72A is further rotated counterclockwise, by the cam surface 86A is disengaged from the lock pin 91A, the lever 80A is rotated clockwise by the biasing force of the spring 82 and again assumes the engagement position shown in FIG. 6(A). Thus, the loading of the record paper P is completed. The lever 80B is of the same construction and operates in the same manner as the lever 80A when the paper is to be loaded.

Figure 7:
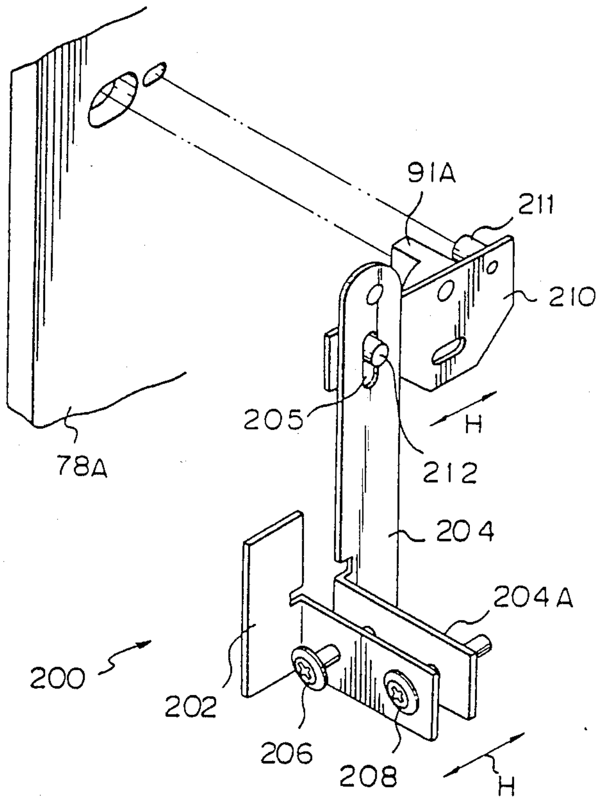
FIGS. 7 and 8 are a perspective view and a side view of an embodiment of an adjustment mechanism for adjusting a horizontal position of the lower paper feed unit.
Figure 8:
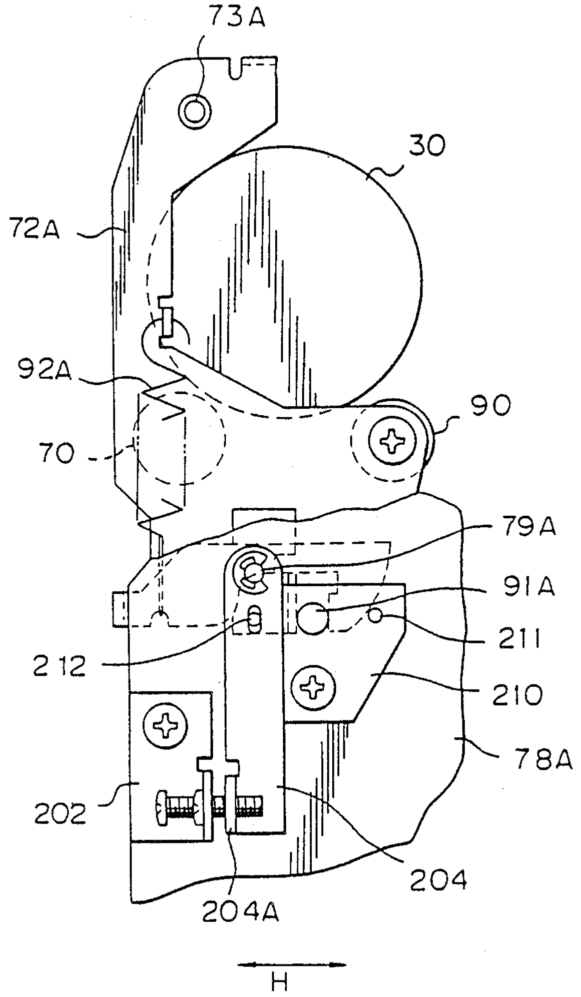

FIGS. 7 and 8 are a perspective view and a side view of an embodiment of the adjusting mechanism 200 arranged on the side C in FIG. 4. The adjusting mechanism 200 adjusts the horizontal position of the press roller 70. In the present embodiment, the horizontal position is adjusted by moving the lock pin 91A.

Numeral 202 denotes a fixed plate fixed to the base 78A, and numeral 204 denotes an adjust lever. A bent portion 204A of the adjust lever 204 is connected to the fixed plate 202 by adjusting bolts 206 and 208. When the adjusting bolts 206 and 208 are driven in, the gap between the bent portion 204A and the fixed plate 202 is increased and decreased, respectively, so that the adjust lever 204 is moved in a direction H.

Numeral 210 denotes an adjust table having the lock pin 91A and a guide pin 211 formed thereon. The lock pin 91A and the guide pin 211 project into the base 78A through an elliptical guide hole having a major axis along the direction H on the base 78A. The adjust table 210 has a pin 212 projected therefrom and the pin 212 is fitted into a hole 205 formed at one end of the adjusting lever 204.

By adjusting the adjust bolts 206 and 208, the adjust table 210 can be moved in the direction H to properly position the lock pin 91A to adjust the horizontal position of the press roller 70.

Figure 9:
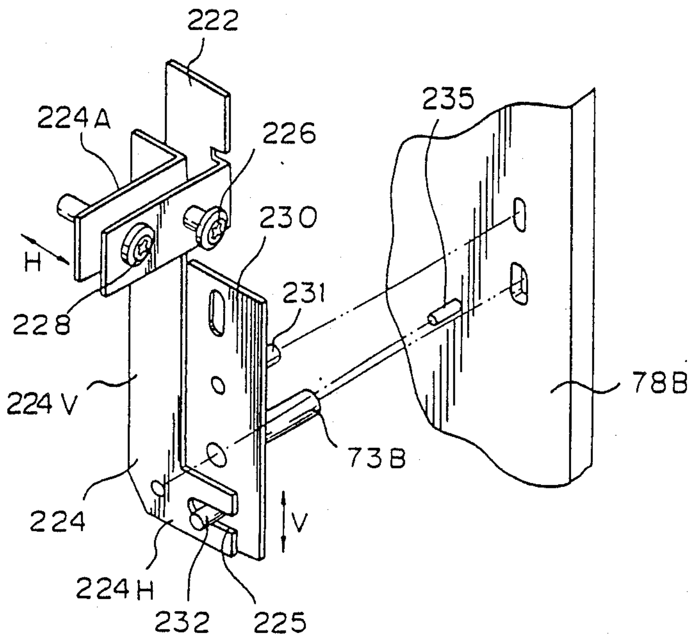
FIGS. 9 and 10 are a perspective view and a side view of an embodiment of an adjustment mechanism for adjusting a vertical position of the lower paper feed unit.
Figure 10:
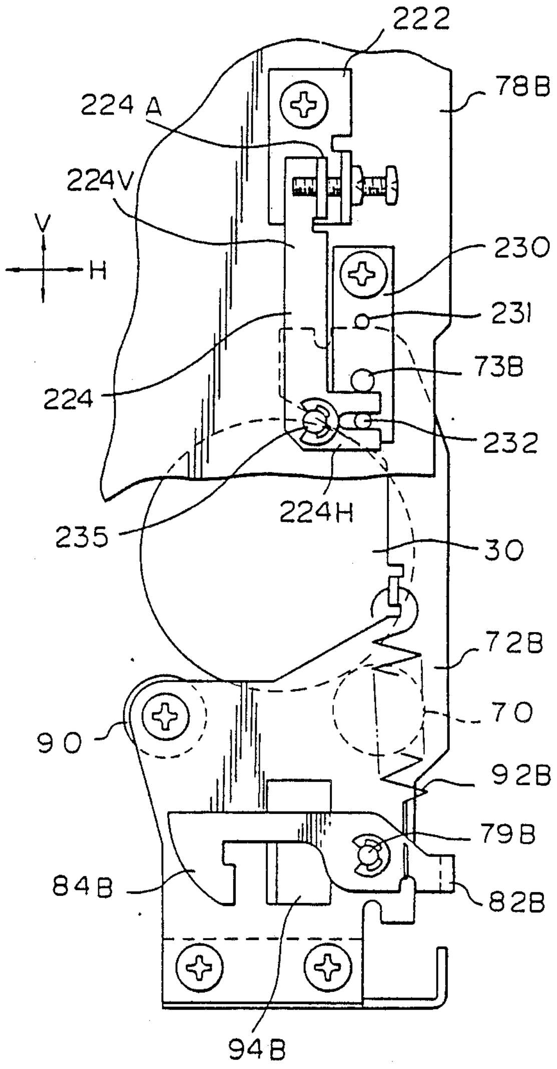

FIGS. 9 and 10 are a perspective view and a side view of an embodiment of the adjust mechanism 220 arranged on the side D in FIG. 4. The adjust mechanism 220 adjusts the vertical position of the press roller 70. In the present embodiment, the vertical position is adjusted by moving the shaft 73B.

Numeral 222 denotes a fixed plate fixed to the base 78B. Numeral 224 denotes an adjust lever which is pivotable around a pin 235 projecting from the base 78B and has an arm 224V extending in a direction V from the pivot point and an arm 224H extending in a direction H. A bent portion 224A formed in the arm 224V of the adjust lever 224 is connected to the fixed plate 222 by adjust bolts 226 and 228. When the adjust bolts 226 and 228 are driven in, the gap between the bent portion 224A and the fixed plate 222 is increased and decreased, respectively, and the adjust lever 224 is rotated around the pin 235.

Numeral 230 denotes an adjust table having a shaft 73B and a guide pin 231. The shaft 73B and the guide pin 231 project into the base 78B through an elliptical guide hole having a major axis in the direction V on the base 78B. The adjust table 230 has a pin 232 projecting therefrom and the pin 232 is fitted into a notch 225 formed in the arm 224H of the adjust lever 224.

Accordingly, by adjusting the adjust bolts 226 and 228, the adjust lever 224 is rotated around the pin 235 and the adjust table 230 is moved in the direction V. Thus, the shaft 73B is properly positioned and the vertical position of the press roller 70 is adjusted.

By the provision of the means 200 and 220 for adjusting the position of the press roller 70 relative to the feed roller 30, the press roller 70 can be properly positioned relative to the feed roller 30.

Such adjust mechanism may also be provided in the decrumpling roller 100.

Figure 11A:
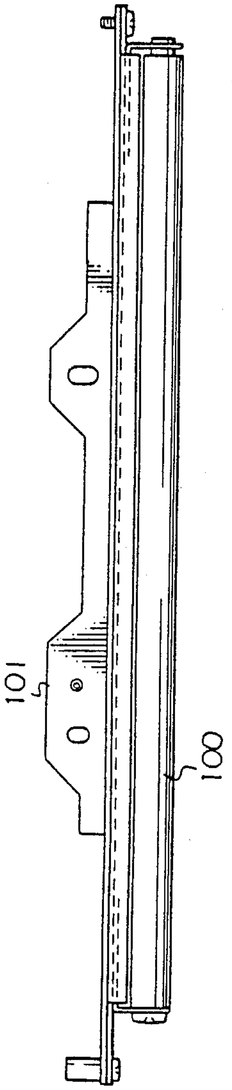
FIGS. 11A, 11B and 11C are a front view, a bottom view and a side view of an embodiment of a spreading roller including a position adjustment mechanism.
Figure 11B:
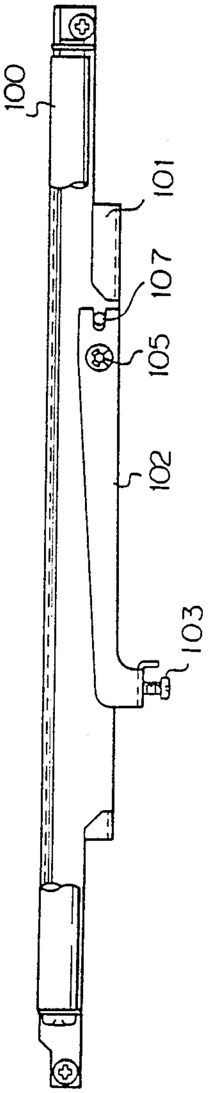
Figure 11C:
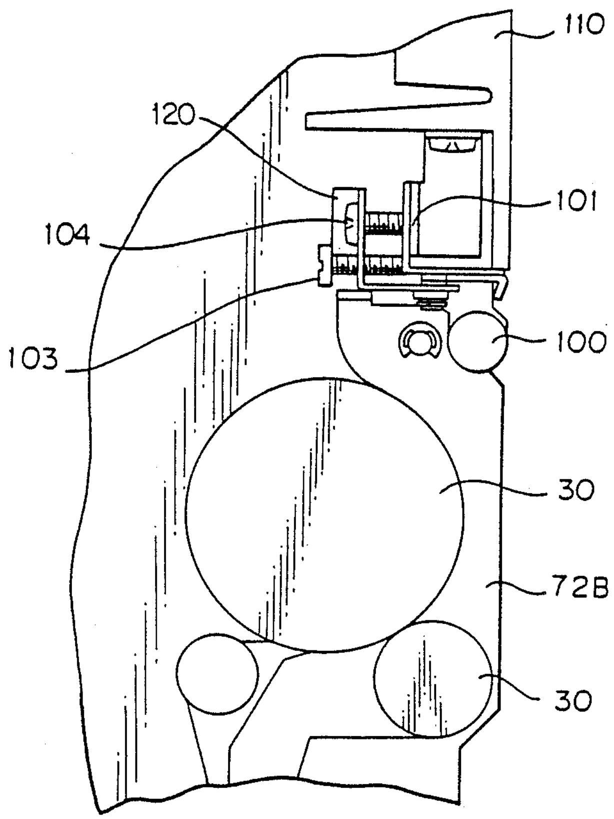

FIGS. 11A, 11B and 11C are a front view, a bottom view and a side view of an embodiment including the decrumpling roller 100. In the present embodiment, the adjust mechanism of the decrumpling roller 100 adjusts the horizontal position.

Numeral 101 denotes a fixed base plate, numeral 102 denotes an adjust lever which is connected to the base plate 101 through adjust bolts 103 and 104 and pivotable around a shaft 105 projecting from the base plate 101 by adjustment of the bolts, and numeral 106 denotes an adjust table which supports the decrumpling roller 100 and engages with one end of the lever 104 through the pin 107. By this adjust mechanism, the horizontal position of the decrumpling roller 100 is adjusted so that the decrumpling roller 100 properly abuts against the record paper P to decrumple the record paper P.

In the present embodiment, the recorder is an ink jet printer and the record medium is a perforated fan-folded paper. However, it should be noted that the present invention is applicable to any recorder having feed means for the record medium and recording means irrespective of its recording system or record medium. For example, the recording system may be a non-impact system as illustrated in the embodiment as an well as impact system and electrophotographic system having a photoconductor drum. The record medium may be rolled paper or cut sheets. Appropriate rollers may be selected depending on the type of the recorder.

While the feed unit housing is opened or closed relative to the recording means housing in the above embodiment, the relation may be readily reversed.

We claim:

1. An ink jet recorder for recording on a continuous form recording medium, the recorder comprising:

a feed roller for feeding the recording medium past recording means, wherein said feed roller is disposed above an accommodation position at which the recording medium is accommodated when the recorder is in an operating position;

a press roller for pressing the recording medium against said feed roller at a pinch position upstream of the recording means in the path of the recording medium; and de-skew support means for supporting the weight of the recording medium across the entire width thereof between the accommodation position and the pinch position, wherein said de-skew support means is disposed adjacent to said feed roller so as to cause the recording medium to contact the periphery of said feed roller for a predetermined wrapping angle before reaching the pinch position.

2. A recording according to claim 1, wherein said de-skew support means includes a de-skew roller, and said press roller and said de-skew roller are mounted on a lever that is pivotable between an operative position in which said press roller and said de-skew roller are operative and a retracted position in which said press roller and said de-skew roller are spaced from said feed roller to permit placement of the recording medium between said press and de-skew rollers and said feed roller.

3. An ink jet recorder according to claim 2, further comprising means for adjusting said press roller in a horizontal direction with respect to said feed roller.

4. An ink jet recorder according to claim 2, further comprising means for adjusting said press roller in a vertical direction with respect to said feed roller.

5. An ink jet recorder according to claim 1, wherein the recording medium comprises perforated recording paper.

6. An ink jet recorder according to claim 1, further comprising a printer unit capable of recording with ink across the width thereof downstream of said pinch position.

7. An ink jet recorder according to claim 6, further comprising a plurality of ink tanks, each said ink tank storing ink having a different color, wherein said printer unit records with ink supplied from said ink tanks.

* * * * *

UNITED STATES PATENT AND TRADEMARK OFFICE
CERTIFICATE OF CORRECTION

PATENT NO. : 4,894,668

DATED : January 16, 1990

INVENTOR(S) : MASAKAZU OZAWA, ET AL.

It is certified that error appears in the above-identified patent and that said Letters Patent is hereby corrected as shown below:

Title page:

IN [75] INVENTORS

"Masa K. Ozawa," should read --Masakazu Ozawa,--.

COLUMN 1

Line 34, "there between" should read --therebetween--.
Line 37, "m" should be deleted.
Line 50, "to" (first occurrence) should be deleted.

COLUMN 2

Line 5, "erros" should read --errors,--.

COLUMN 3

Line 11, "accomodated" should read --accommodated--.
Line 19, "accomodation" should read --accommodation--.

COLUMN 5

Line 33, "numerals 25,115 and 145" should read --numerals 25, 115 and 145--.
Line 38, "Numeral, numeral 142" should read --Numeral 142--.

UNITED STATES PATENT AND TRADEMARK OFFICE
CERTIFICATE OF CORRECTION

PATENT NO. : 4,894,668

DATED : January 16, 1990

INVENTOR(S) : MASAKAZU OZAWA, ET AL.

It is certified that error appears in the above-identified patent and that said Letters Patent is hereby corrected as shown below:

COLUMN 6

Line 30, "adopted" should read --adapted--.
Line 35, "block plate" should read --lock plate--.
Line 57, "by" should be deleted.

COLUMN 8

Line 14, "an well as" should read --well as an--.
Line 42, "A recording" should read --An ink jet recorder--.

Signed and Sealed this

Twentieth Day of August, 1991

Attest:

HARRY F. MANBECK, JR.

Attesting Officer

Commissioner of Patents and Trademarks